US010262516B2

(12) United States Patent
Bechhoefer

(10) Patent No.: US 10,262,516 B2
(45) Date of Patent: Apr. 16, 2019

(54) INTEGRATED HANGER BEARING MONITOR

(71) Applicant: Eric Robert Bechhoefer, Cornwall, VT (US)

(72) Inventor: Eric Robert Bechhoefer, Cornwall, VT (US)

(73) Assignee: Green Power Monitoring Systems, Inc., Cornwall, VT (US)

( * ) Notice: Subject to any disclaimer, the term of this patent is extended or adjusted under 35 U.S.C. 154(b) by 7 days.

(21) Appl. No.: 15/610,798

(22) Filed: Jun. 1, 2017

(65) Prior Publication Data

US 2017/0352239 A1 Dec. 7, 2017

Related U.S. Application Data

(60) Provisional application No. 62/344,060, filed on Jun. 1, 2016.

(51) Int. Cl.
| G08B 21/04 | (2006.01) |
| G01M 13/045 | (2019.01) |
| G07C 5/08 | (2006.01) |
| F16C 19/52 | (2006.01) |
| B64D 1/08 | (2006.01) |
| F16C 35/04 | (2006.01) |
| B64F 5/60 | (2017.01) |
| B64D 45/00 | (2006.01) |

(52) U.S. Cl.
CPC .......... *G08B 21/0423* (2013.01); *B64D 1/08* (2013.01); *B64F 5/60* (2017.01); *F16C 19/522* (2013.01); *F16C 19/527* (2013.01); *F16C 35/047* (2013.01); *G01M 13/045* (2013.01); *G07C 5/085* (2013.01); *B64D 2045/0085* (2013.01); *F16C 2326/43* (2013.01)

(58) Field of Classification Search
CPC .......................... G08D 21/0423; G01M 17/00
See application file for complete search history.

(56) References Cited

U.S. PATENT DOCUMENTS

| 3,129,904 | A | 4/1964 | Francis | |
| 5,381,692 | A | 1/1995 | Winslow | |
| 5,527,004 | A * | 6/1996 | Haggerty | B64C 13/12 244/229 |
| 6,711,952 | B2 * | 3/2004 | Leamy | F01D 21/00 73/579 |
| 7,425,097 | B1 * | 9/2008 | Chappell | G01C 19/16 384/109 |
| 8,024,980 | B2 * | 9/2011 | Arms | G01L 1/2225 73/761 |
| 8,131,420 | B2 * | 3/2012 | Lynch | G07C 5/085 340/425.5 |

(Continued)

FOREIGN PATENT DOCUMENTS

WO 2015195174 A2 12/2015

*Primary Examiner* — Alex C Dunn
(74) *Attorney, Agent, or Firm* — Justin W. McCabe; Dunkiel Saunders Elliott Raubvogel & Hand, PLLC

(57) ABSTRACT

An integrated hanger bearing monitor is provided for reducing installation time and added weight that includes a sensor and an interconnect on a mounting bracket that is sized and configured to be attached to a hanger bearing mounting bracket via connectors that mount the hanger bearing mounting bracket to the helicopter.

19 Claims, 7 Drawing Sheets

(56) References Cited

U.S. PATENT DOCUMENTS

| | | | |
|---|---|---|---|
| 8,167,575 B2* | 5/2012 | Eusterbarkey | F03D 15/10 |
| | | | 416/244 R |
| 8,402,844 B2 | 3/2013 | Zakrzewski | |
| 8,744,651 B2* | 6/2014 | Bates | G05B 23/0254 |
| | | | 701/14 |
| 9,063,549 B1* | 6/2015 | Pennecot | G05D 1/0259 |
| 9,389,486 B1* | 7/2016 | Goddard | G03B 17/02 |
| 9,797,801 B2* | 10/2017 | Batcheller | G01M 7/00 |
| 2006/0275120 A1* | 12/2006 | Parsons | B64C 27/605 |
| | | | 416/114 |
| 2009/0151616 A1* | 6/2009 | Han | B63B 35/38 |
| | | | 114/266 |
| 2011/0158806 A1* | 6/2011 | Arms | F03D 1/0658 |
| | | | 416/31 |
| 2012/0087101 A1* | 4/2012 | Gall | H05K 7/1457 |
| | | | 361/809 |
| 2013/0211737 A1* | 8/2013 | Batcheller | G01M 7/00 |
| | | | 702/34 |
| 2016/0304192 A1* | 10/2016 | Hale | B64C 27/006 |
| 2017/0274992 A1* | 9/2017 | Chretien | B64C 27/14 |
| 2018/0047225 A1* | 2/2018 | Batcheller | G07C 5/008 |

* cited by examiner

INTEGRATED HANGER BEARING MONITOR

RELATED APPLICATION DATA

This application claims priority to U.S. Provisional Application No. 62/344,060 filed on Jun. 1, 2016, and titled "Integrated Hanger Bearing Monitor and Method of Mounting and Monitoring a Hanger Bearing," which is incorporated herein in its entirety.

FIELD OF THE INVENTION

The present invention generally relates to the monitoring of vibrating equipment. In particular, the present invention is directed to an integrated hanger bearing monitor and method of mounting a hanger bearing monitor.

BACKGROUND

Helicopters employ a tail rotor to counteract the torque exerted by the main rotor and thereby provide stability and direction control. The tail rotor is driven by a tail rotor driveshaft. Because the helicopter tail boom cannot be perfectly ridged, the tail rotor driveshaft is typically designed to be supported by bearings so that some movement can occur. Typically, the driveshaft is supported by hanger bearings (also referred to as tail rotor driveshaft support bearings).

FIG. 1 shows an exploded view of an exemplary prior art tail rotor driveshaft 1. The circled items in FIG. 1 are exemplary prior art pieces of a hanger bearing support system 2. Although not all hanger bearing support systems are designed alike, in general a hanger bearing support system has two functions: 1) to support the tail rotor driveshaft and 2) to maintain the hanger bearing alignment with the tail boom. As shown in prior art FIG. 2, a hanger bearing support system 20 is supporting a driveshaft 10 of a helicopter and is securely attached to a tail boom 30 of the helicopter by a hanger bearing system bracket 40.

As transmission of torque through the tail rotor driveshaft is necessary for the operation of the helicopter, monitoring the degradation and wear of the hanger bearing assists operators and maintenance personnel with maintaining a strong connection between the components of the tail rotor driveshaft. To that end, helicopters often include health and usage monitoring systems (HUMS), which use sensors and other sources of data on a helicopter to keep track of and determine the status and condition of various aspects of the helicopter. HUMS can monitor hanger bearings for degradation and wear, but in order to properly monitor a hanger bearing for degradation and wear, a sensor or monitoring device needs to be able to detect the vibrations associated with the hanger bearing and the tail rotor shaft assembly. This requires that the monitoring device be attached, generally in very close proximity, to the hanger bearing so as to ensure a good transfer path from those vibrations to the monitoring device.

Monitoring devices for detecting these vibrations that are installed proximate hanger bearings typically include accelerometers, which can measure information from which features can be extracted that are characteristic of hanger bearing faults. Additionally, accelerometers can measure features associated with shaft damage, such as imbalance, a bent shaft, or a failure of the shaft coupling.

However, installing monitoring devices on or near hanger bearings can pose challenges. For many aircraft, the hanger bearing is relatively small and therefore mounting a monitoring device proximate the hanger bearing is difficult. As shown in the prior art hanger bearing support system 20 in FIG. 2, for example, the hanger bearing mounting bracket 40 includes ¼ inch bolts (50a and 50b) that are spaced about 2.5 inches apart. Further, as can been seen, there is little clearance between the tail boom 30 and the driveshaft 10 where a hanger bearing monitor can be properly and securely mounted given the size and connection requirements of such monitoring devices. For current digital sensors (such as the sensor 60 shown in prior art FIG. 3), for example, the sensor is bused, which requires an interconnect (such as of the interconnect 70 shown in prior art FIG. 4) with a bus/power cable. As is evident, the size, shape and configuration of digital sensors do not make them conducive for mounting to a hanger bearing. Moreover, a typical interconnect 70 includes two mounting apertures 80 (80a and 80b in prior art FIG. 4). For aviation and other high vibration installations, the two mounting apertures 80 help ensure that the interconnect 70 does not loosen or turn over time; however, the downside of this design is that it necessitates drilling two holes in the tail boom 30 structure to mount the interconnect 70, which adds cost and time to mounting.

Therefore, there is a need for a hanger bearing monitor that can be properly and securely mounted to a hanger bearing mounting bracket on a tail boom of a helicopter in a cost effective manner and that does not add much extra weight to the system.

SUMMARY OF THE DISCLOSURE

An integrated hanger bearing monitor for a helicopter is provided that includes a monitor bracket that is configured to mount to a hanger bearing bracket and the monitor bracket includes two apertures, each surrounded by respective recessed areas, wherein the hanger bearing bracket is configured to be attached to a tail boom of the helicopter and is configured to be attached, with two connectors, to a hanger bearing that is configured to support a tail rotor driveshaft of the helicopter and wherein when the monitor bracket is mounted to the hanger bearing bracket the two connectors respectively pass through the two apertures and engage with the respective recessed areas. A sensor package is integrated with the monitor bracket and includes an accelerometer and an interconnect.

In another embodiment, an integrated hanger bearing monitor for monitoring vibrations associated with a tail rotor shaft assembly of a helicopter is provided that includes a monitor bracket configured to mount to a hanger bearing bracket, the hanger bearing bracket configured to be attached to a tail boom of the helicopter and to couple, with a plurality of connectors, to a hanger bearing configured to support the tail rotor driveshaft of the helicopter, wherein the monitor bracket includes a plurality of apertures, each surrounded by respective recessed areas, and wherein the plurality of connectors respectively pass through the plurality of apertures and engage with the respective recessed areas when the monitor bracket is mounted to the hanger bearing bracket and the hanger bearing is coupled to the hanger bearing bracket. A sensor package is integrated with the monitor bracket and includes a fully potted enclosure, an accelerometer, and an interconnect.

In another embodiment, a system for monitoring vibrations associated with a rotor shaft assembly of a helicopter is provided that includes a hanger bearing supporting a tail rotor driveshaft of the helicopter, a hanger bearing bracket attached to a tail boom of the helicopter, wherein the hanger bearing is attached to the hanger bearing bracket with a plurality of connectors, and a monitor bracket having a plurality of apertures, each aperture being surrounded by respective recessed areas. The monitor bracket is attached to the hanger bearing bracket such that a one of each of the plurality of connectors passes through a one of each of the plurality of apertures and engages with the respective recessed areas, wherein the hanger bearing bracket includes a swale that is sized, shaped, and positioned to prevent the hanger bearing bracket from interfering with the tail rotor driveshaft, and the monitor bracket includes a monitor bracket swale that is sized, shaped, and positioned to approximately match the hanger bearing bracket swale. The system also includes a sensor package attached to the monitor bracket, and the sensor package includes an accelerometer and an interconnect.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

An integrated hanger bearing monitor as disclosed herein reduces the cost and weight associated with hanger bearing monitor devices as well as the time associated with the installation of such devices. Additionally, embodiments of the improved hanger bearing monitor disclosed herein are designed and configured to include a sensor and connections that do not interfere with a helicopter's tail rotor driveshaft. Further, embodiments of the hanger bearing monitor discussed herein do not interfere with the use of a fairing that covers the drive shaft when installed. Embodiments of the hanger bearing monitor discussed herein can use existing electrical connections on the helicopter for powering itself and sending data to the HUMS.

Figure 1:
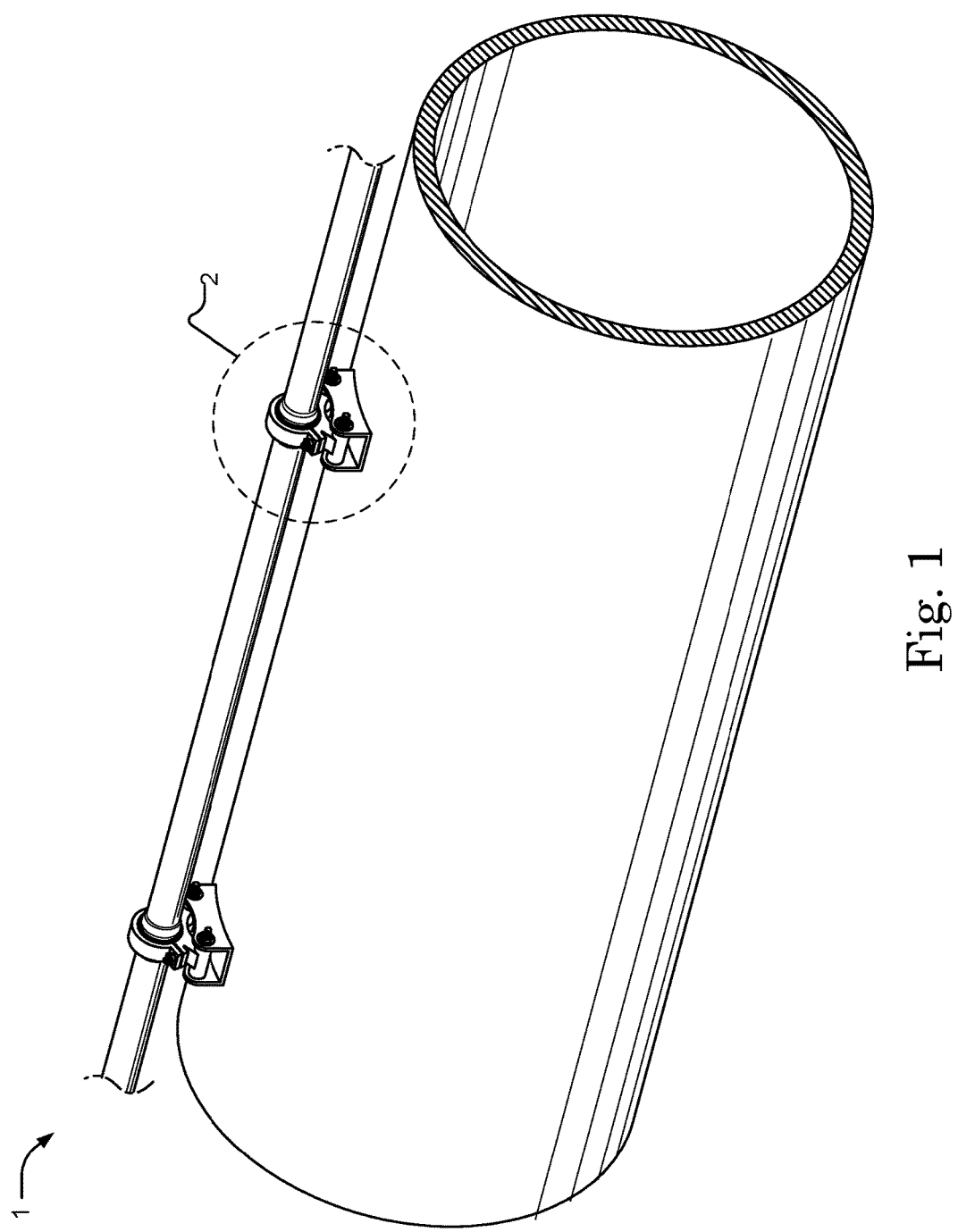
FIG. 1 is an exploded view of a prior art tail boom driveshaft.
Figure 2:
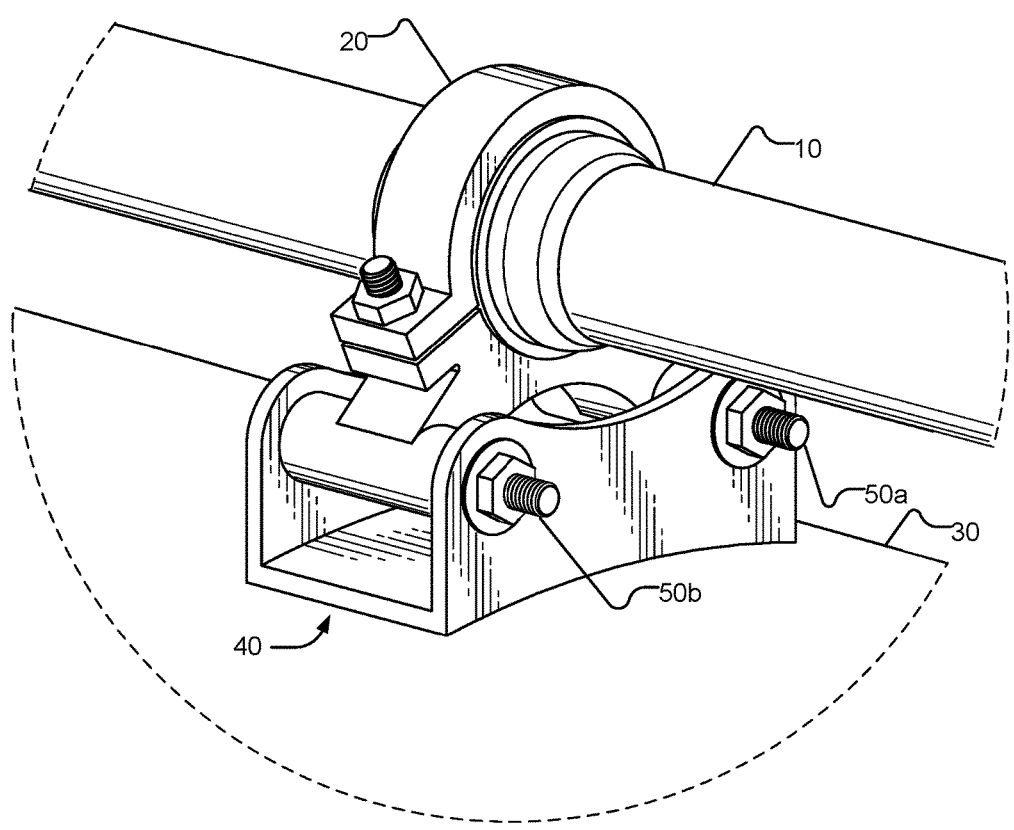
FIG. 2 depicts a prior art hanger bearing support system for a helicopter.
Figure 3:
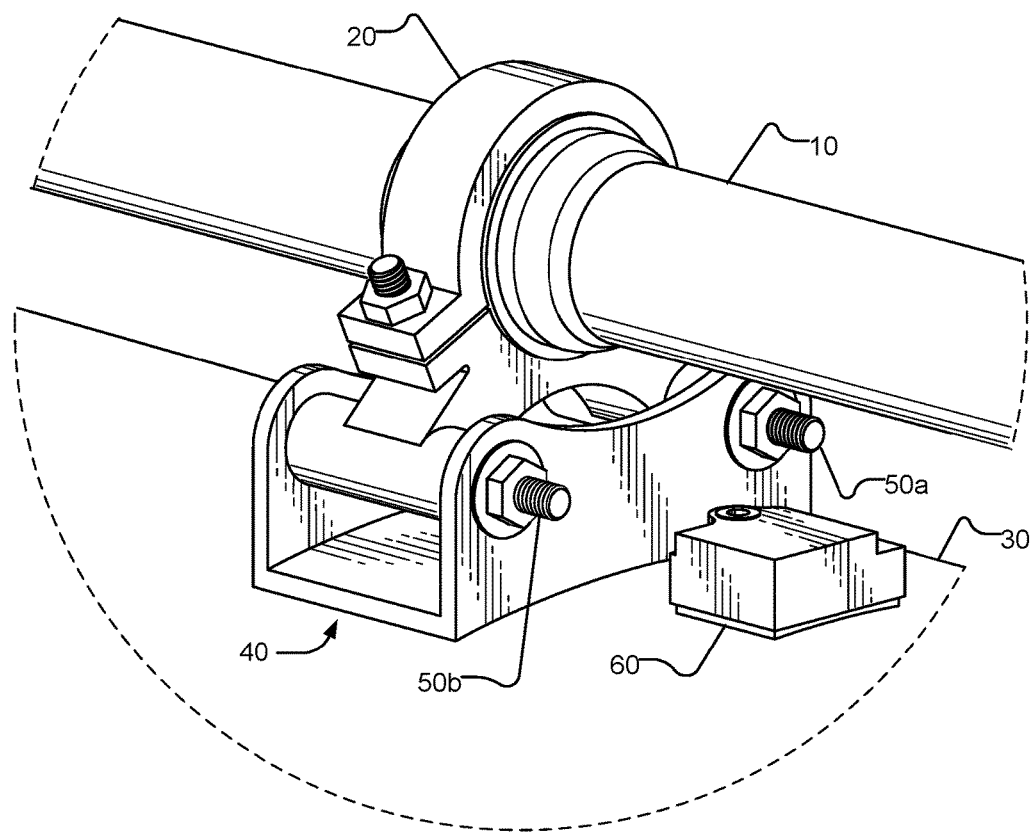
FIG. 3 depicts a prior art digital sensor placed proximate a hanger bearing support system.
Figure 4:
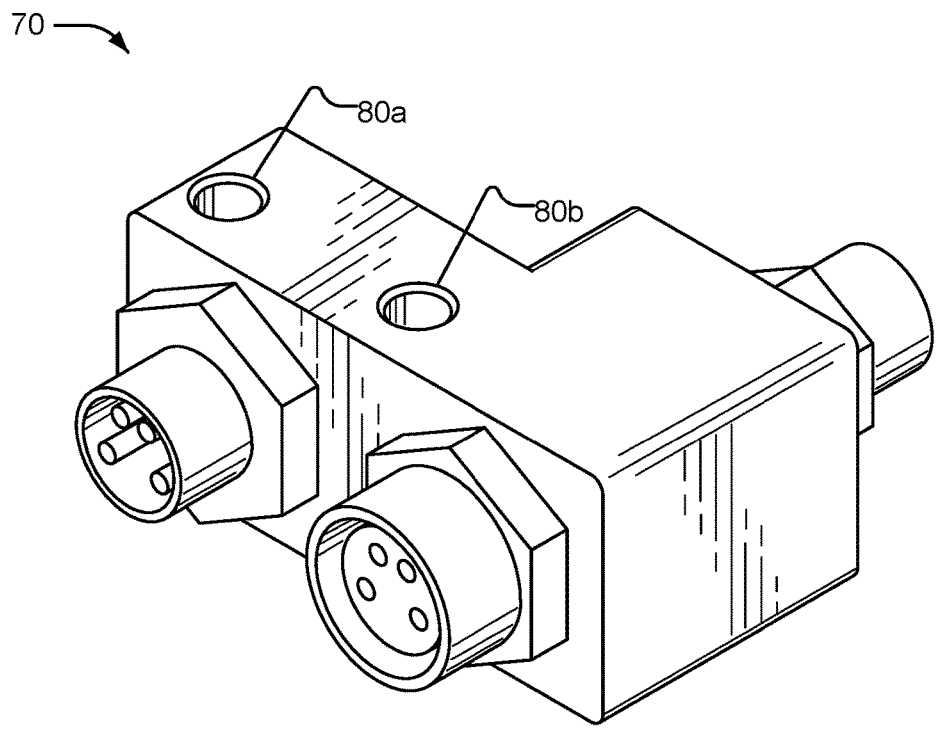
FIG. 4 depicts a prior art interconnect for a helicopter.
Figure 5:
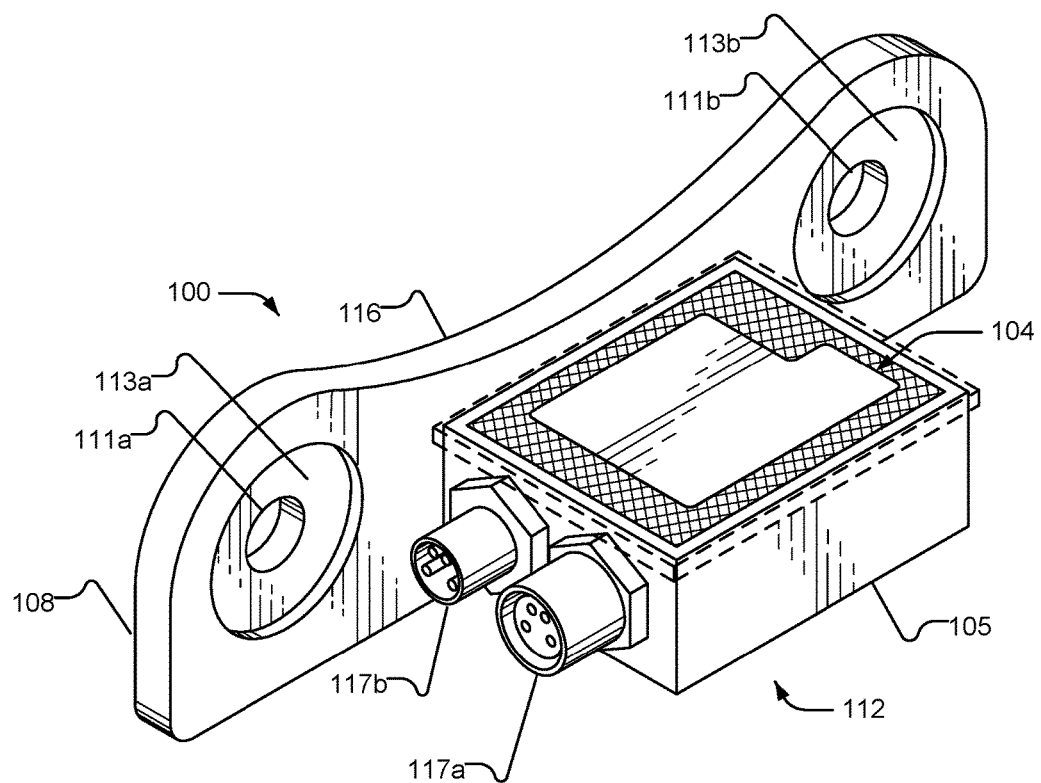
FIG. 5 depicts an integrated hanger bearing monitor with a cutaway view of the internal components of the sensor and interconnect according to an embodiment of the present invention.

Turning now to FIG. 5, there is shown an exemplary embodiment of an integrated hanger bearing monitor 100 according to the present disclosure. In this embodiment, a sensor 104, a monitor bracket 108, and a data bus interconnect 112 are combined to form integrated hanger bearing monitor 100 so as to reduce the time, cost, and weight involved with mounting a sensor for a hanger bearing in an appropriate position along the tail rotor driveshaft along with communication equipment and mounting structure.

Monitor bracket 108 may have a thickness of about 1 cm to about 10 cm, and preferably from about 2 cm to about 4 cm.

In an exemplary embodiment, sensor 104 is enclosed in an enclosure 105. Sensor 104 can be digital and use a two board solution. In this embodiment, one of the boards has a microcontroller with floating point unit, RAM, a power supply (28 volt to 3.3 volt) and a RS-485 transceiver. As helicopter supply power is usually 28 volt, in this embodiment sensor 104 uses 28 volt on the data bus, which reduces the current. In this embodiment, the current is 8.5 times less (28/3.3 times less) than the usual helicopter supply power. Since power dissipation on the data bus is proportional to the current squared, using higher voltage allows for the use of smaller gauge cable, which is lighter than larger gauge cable. The data bus is terminated on the power supply (a buck converter) and transceiver, respectively.

In this embodiment, the second board of sensor 104 includes an accelerometer, a signal conditioning network, and an analog-to-digital converter. Power and control (in this embodiment via an SPI (serial peripheral interface) bus) from the first board is by two, 4-pin connectors, which also function to maintain board spacing. Overall, sensor 104 is conductive (for example, sensor 104 may be aluminum, stainless steel or titanium) and mounts to a male (input bus) m8, and female (output bus) m8 connector. A four wire harness is fully shielded and the shield is contiguous with sensor 104. In a preferred embodiment, sensor 104 is fully potted, which ensures a good transfer function of the vibrations from a tail rotor driveshaft to enclosure 105 and then through to the accelerometer. Fully potting sensor 104 also ensures that no moisture can enter so as to damage the electronic components. In one embodiment, vibration data measured by sensor 104 is processed locally at the accelerometer and returns condition monitoring indicators.

Monitor bracket 108 is designed and configured to mount to a helicopter's hanger bearing bracket 109. Hanger bearing bracket 109 is attached to a tail boom 130 of the helicopter and supports a hanger bearing 120. Hanger bearing 120 ultimately supports a tail rotor driveshaft 110 (shown in FIG. 6). In an exemplary embodiment, monitor bracket 108 includes a plurality of apertures 111 (e.g., 111a and 111b, which can be seen in FIG. 5) sized and configured to mate with corresponding apertures in the hanger bearing bracket 109. In an exemplary embodiment, monitor bracket 108 includes a swale 116 that allows monitor bracket 108 to avoid interfering with tail rotor driveshaft 110 and any fairing attached to the helicopter (e.g., swale 116 may approximate a similar swale found in hanger bearing bracket 109).

Figure 6:
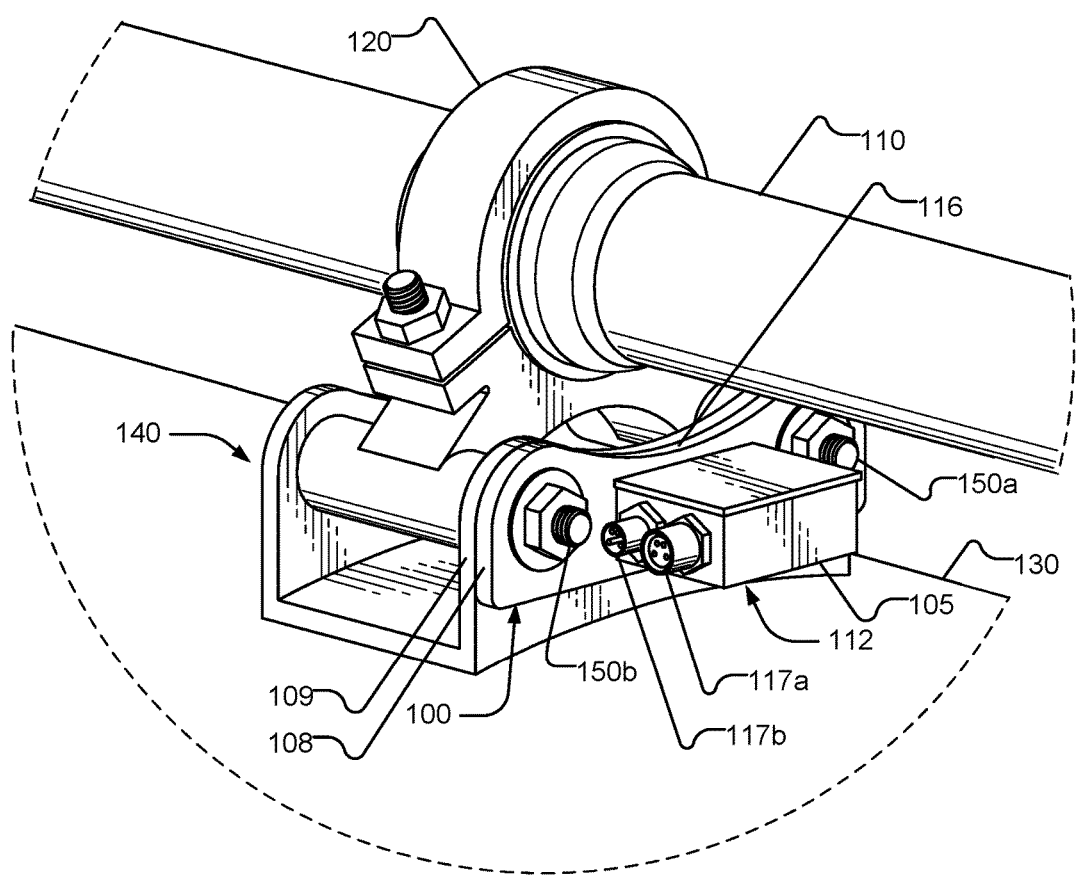
FIG. 6 depicts the integrated hanger bearing monitor mounted on a hanger bearing bracket according to an embodiment of the present invention.

As shown in FIGS. 5 and 6, enclosure 105 that contains sensor 104 is designed to have a profile and to mount to monitor bracket 108 so that monitor bracket 108 in combination with enclosure 105 will mount easily on banger bearing bracket 109. In certain embodiments, bracket apertures 111 may include a recessed area 113 (e.g., 113a and 113b, which can be seen in FIG. 5) so that preexisting bolts 150 (e.g., 150a and 150b, shown in FIG. 6), which are typically used to secure hanger bearing 120 to hanger bearing bracket 109, can also be used to attach monitor bracket 108 to banger bearing bracket 109 as well. The rest of monitor bracket 108 outside of recessed areas 113 is slightly thicker to add stiffness and improve the transfer of vibrations from hanger bearing 120 and/or tail rotor driveshaft 110 to sensor 104. Preferably, monitor bracket 108 may have a thickness of about 1 mm to about 5 mm or more, or be similar in thickness to hanger bearing bracket 109.

Integrated hanger bearing monitor 100 includes an interconnect 112 that facilitates communication and power transmission between sensor 104 and the other electrical components installed on the helicopter, including additional sensors and a HUMS if available. Interconnect 112 can have a data bus cable for receiving inputs (not shown) and two outputs (outputs 117a and 117b in FIG. 6). In this embodiment, output 117b may go to another sensor on the helicopter via a data bus harness to an interconnect on the next sensor on the helicopter, and the other output, 117a, may connect with a previous sensor on the helicopter or to a HUMS.

Figure 7:
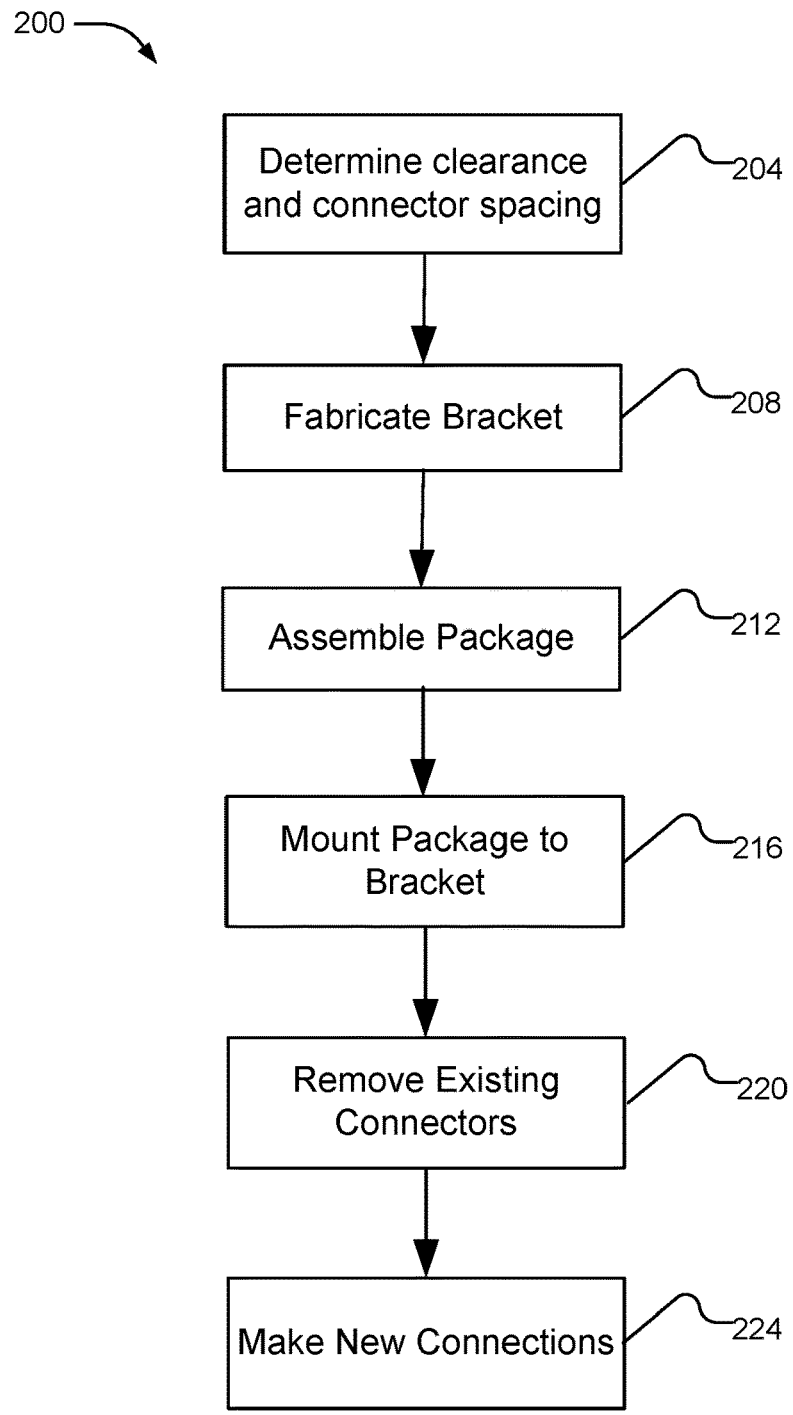
FIG. 7 is a method of designing an integrated hanger bearing monitor according to an embodiment of the present invention.

Turning now to FIG. 7, there is shown an exemplary process 200 for developing an integrated hanger bearing monitor. At step 204, the clearance and spacing of connectors related to a hanger bearing support bracket of a helicopter are determined. At step 208, a monitor bracket is fabricated to approximate the shape and configuration of the hanger bearing support bracket. At step 212, an appropriate sensor and interconnect package is assembled. The sensor and interconnect package are preferably contained within a single package and have a profile that allows for installation below the tail boom driveshaft and fairing (if used) of the helicopter. At step 216 the sensor and interconnect package are attached to the monitor bracket. At step 220, connectors holding the hanger bearing support bracket are removed and the integrated hanger bearing monitor is placed proximate the hanger bearing support bracket such that the connectors can be used to mount the integrated hanger bearing monitor to the hanger bearing support bracket. At step 224 bus connections are made to and from the sensor and interconnect package so that the integrated hanger bearing monitor can send and pass along data to other parts of the helicopter.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An integrated hanger bearing monitor for a helicopter comprising:
    a monitor bracket configured to be mounted to a hanger bearing bracket, the monitor bracket including two apertures, each surrounded by respective recessed areas, wherein the hanger bearing bracket is configured to be attached to a tail boom of the helicopter and is configured to be attached, with two connectors, to a hanger bearing that is configured to support a tail rotor driveshaft of the helicopter and wherein when the monitor bracket is mounted to the hanger bearing bracket the two connectors respectively pass through the two apertures and engage with the respective recessed areas; and
    a sensor package including an accelerometer and an interconnect, wherein the sensor package is integrated with the monitor bracket.

2. The integrated hanger bearing monitor of claim 1 further including an enclosure integrated with the monitor bracket, wherein the enclosure contains the sensor package.

3. The integrated hanger bearing monitor of claim 2 wherein the enclosure is fully potted.

4. The integrated hanger bearing monitor of claim 1 wherein the interconnect includes two outputs and wherein the outputs are connected to sensors on the helicopter.

5. The integrated hanger bearing monitor of claim 4 wherein the sensor package includes a first board having a microcontroller, a power supply, and a transceiver, and a second board having the accelerometer, a signal conditioning network, and an analog-to-digital converter.

6. The integrated hanger bearing monitor of claim 5 wherein vibration data measured by the accelerometer is processed in the sensor package and the sensor package sends condition monitoring indicators through the interconnect.

7. The integrated hanger bearing monitor of claim 1 wherein the integrated hanger bearing monitor has a thickness of between 2 cm and 4 cm.

8. The integrated hanger bearing monitor of claim 1 wherein the monitor bracket includes a swale that is sized, shaped, and positioned to prevent the monitor bracket from interfering with the tail rotor driveshaft when the monitor bracket is mounted to the hanger bearing bracket.

9. An integrated hanger bearing monitor for monitoring vibrations associated with a tail rotor shaft assembly of a helicopter, comprising:
    a monitor bracket configured to mount to a hanger bearing bracket, the hanger bearing bracket configured to be attached to a tail boom of the helicopter and to couple, with a plurality of connectors, to a hanger bearing configured to support a tail rotor driveshaft of the helicopter, wherein the monitor bracket includes a plurality of apertures, each surrounded by respective recessed areas, and wherein the plurality of connectors respectively pass through the plurality of apertures and engage with the respective recessed areas when the monitor bracket is mounted to the hanger bearing bracket and the hanger bearing is coupled to the hanger bearing bracket; and
    a sensor package integrated with the monitor bracket and including a fully potted enclosure, an accelerometer within the enclosure, and an interconnect.

10. The integrated hanger bearing monitor of claim 9 wherein the interconnect includes two outputs and wherein the outputs are connected to sensors on the helicopter.

11. The integrated hanger bearing monitor of claim 9 wherein the sensor package includes a first board having a microcontroller, a power supply, and a transceiver and a second board having the accelerometer, a signal conditioning network, and an analog-to-digital converter.

12. The integrated hanger bearing monitor of claim 10 wherein vibration data measured by the accelerometer is processed in the sensor package and the sensor package sends condition indicators through the interconnect.

13. The integrated hanger bearing monitor of claim 9 wherein the monitor bracket has a thickness of between 2 cm and 4 cm.

14. The integrated hanger bearing monitor of claim 9 wherein the monitor bracket includes a swale that is sized, shaped, and positioned to prevent the monitor bracket from interfering with the tail rotor driveshaft when the monitor bracket is mounted to the hanger bearing bracket.

15. A system for monitoring vibrations associated with a rotor shaft assembly of a helicopter, comprising:
    a hanger bearing supporting a tail rotor driveshaft of the helicopter;
    a hanger bearing bracket attached to a tail boom of the helicopter, wherein the hanger bearing is attached to the hanger bearing bracket with a plurality of connectors;
    a monitor bracket having a plurality of apertures, each aperture being surrounded by respective recessed areas, wherein the monitor bracket is attached to the hanger bearing bracket such that a one of each of the plurality of connectors passes through a one of each of the plurality of apertures and engages with the respective recessed areas, wherein the hanger bearing bracket includes a swale that is sized, shaped, and positioned to prevent the hanger bearing bracket from interfering with the tail rotor driveshaft, and wherein the monitor bracket includes a monitor bracket swale that is sized, shaped, and positioned to approximately match the hanger bearing bracket swale; and a sensor package attached to the monitor bracket, the sensor package including an accelerometer and an interconnect.

16. The system for monitoring vibrations of claim 15 wherein the interconnect includes two outputs and wherein the outputs are connected to sensors on the helicopter.

17. The system for monitoring vibrations of claim 15 wherein the sensor package includes a first board having a microcontroller, a power supply, and a transceiver and a second board having the accelerometer, a signal conditioning network, and an analog-to-digital converter.

18. The system for monitoring vibrations of claim 15 wherein vibration data measured by the accelerometer is processed in the sensor package and the sensor package sends condition indicators through the interconnect.

19. The system for monitoring vibrations of claim 15 wherein the monitor bracket has a thickness of between 2 cm and 4 cm.

\* \* \* \* \*